Oct. 27, 1970  H. F. FRUTH ET AL  3,535,822
APPLICATOR
Filed Feb. 27, 1968  2 Sheets-Sheet 1
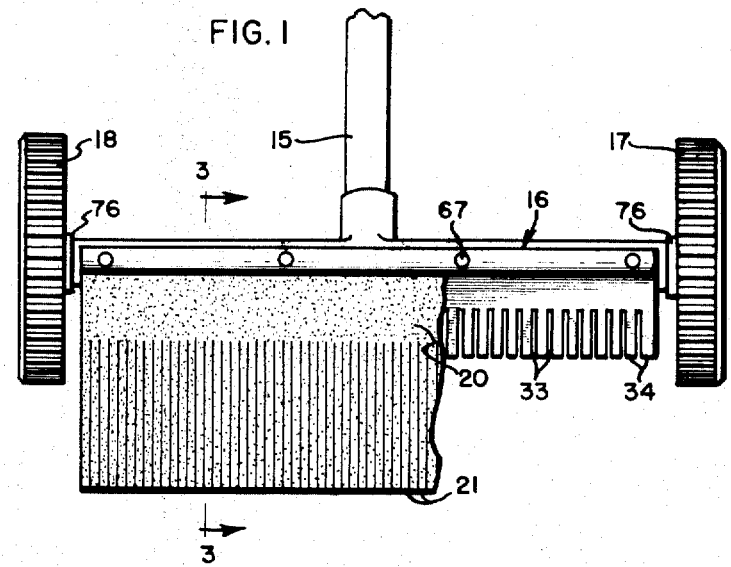
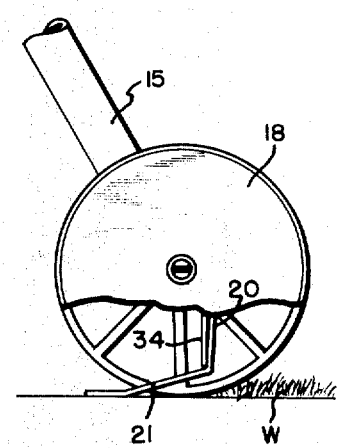
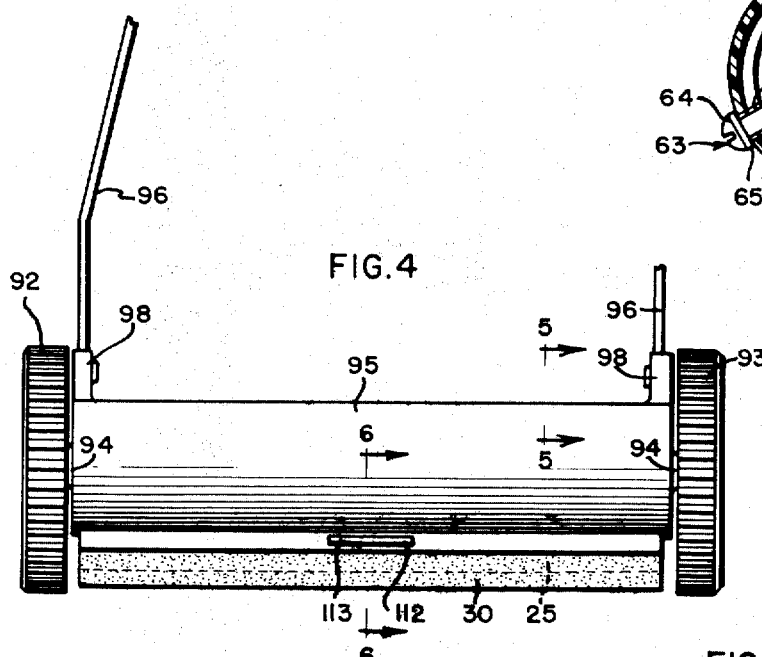
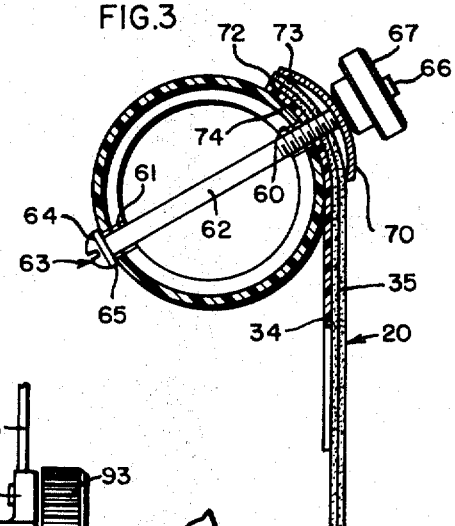
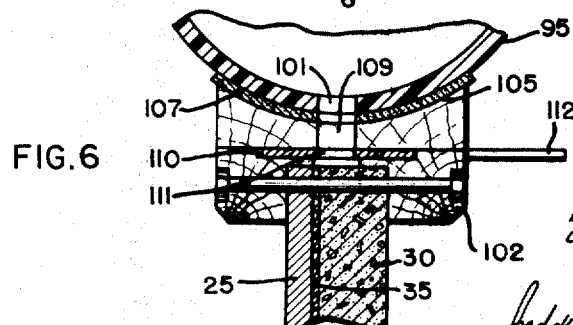
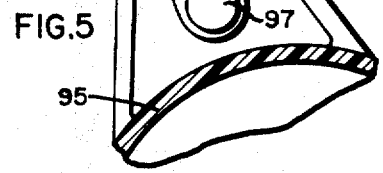
INVENTORS
EDWIN W. SCHMUNK
EXECUTOR OF THE ESTATE OF HAL F. FRUTH, DECEASED
CARL J. MITCHELL
Anderson, Luedeka, Fitch, Even, & Tabin  ATTYS.

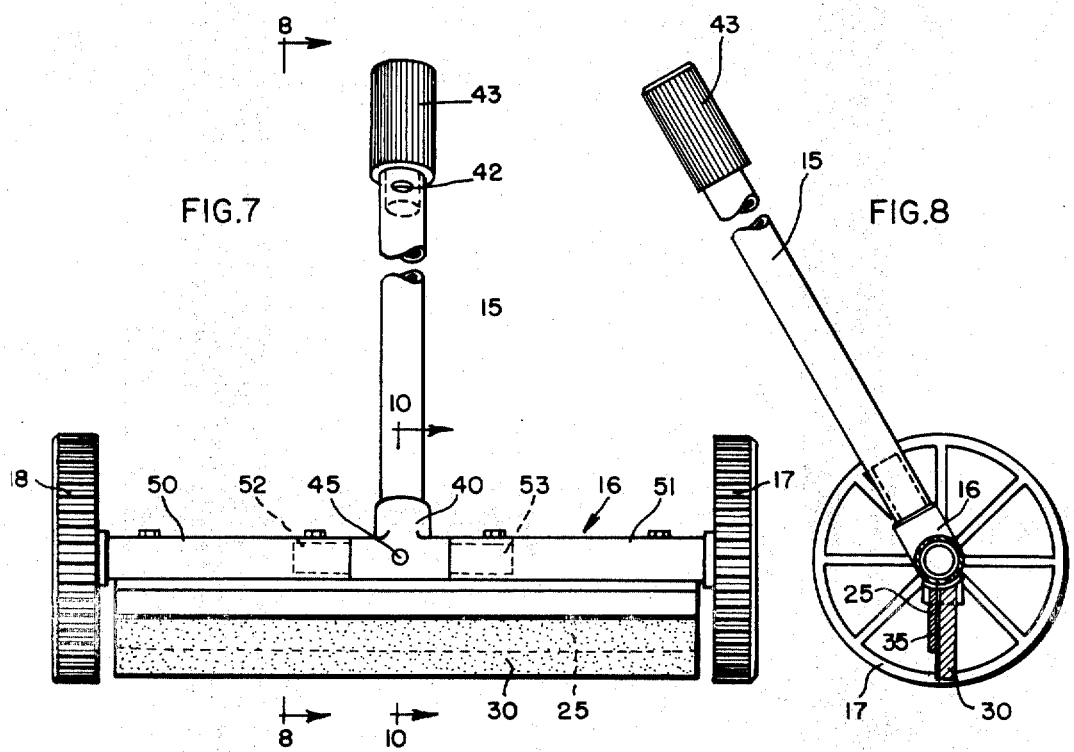
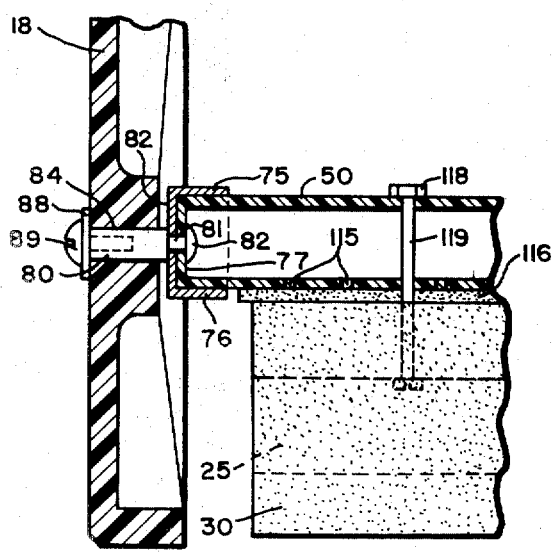
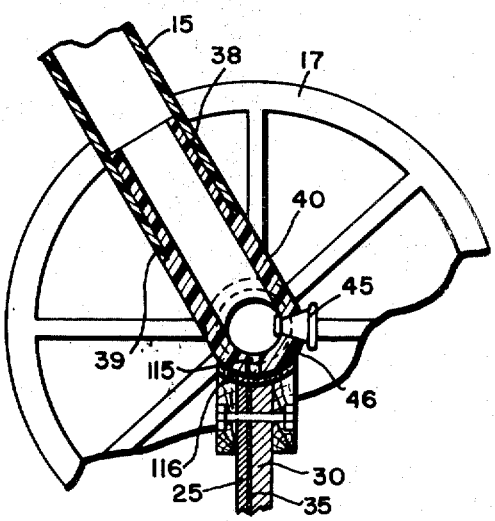

> United States Patent Office 3,535,822
Patented Oct. 27, 1970

3,535,822
APPLICATOR
Hal F. Fruth, deceased, late of Skokie, Ill., by Edwin W. Schmunk, executor, 242 Imperial St., Park Ridge, Ill. 60068, and Carl J. Mitchell, 10519 Rte. 120, Woodstock, Ill. 60098
Continuation-in-part of application Ser. No. 393,967, Sept. 2, 1964. This application Feb. 27, 1968, Ser. No. 708,722
Int. Cl. A01c 23/00
U.S. Cl. 47—1.5       3 Claims

ABSTRACT OF THE DISCLOSURE

A liquid, such as a herbicide or pesticide, is applied at a controlled rate to vegetation by rubbing contact with and squeezing of a compressible, porous applicator against a pressure means such as a plate. The applicator is mounted on a wheeled body for rolling across the turf and carries a liquid receiving chamber which is in fluid communication with the applicator.

---

This is a continuation-in-part application of copending application Ser. No. 393,967 filed Sept. 2, 1964 and now abandoned, and entitled "Rolling Applicator for Weed Killing Solution."

This invention relates to an apparatus for applying a herbicide, pesticide or the like and more particularly to applying a herbicide to plant growth such as weeds on a lawn or weeds in an agricultural field.

Elimination and controlling of unwanted vegetation, such as weeds, without risk to the other approximate vegetation, such as flowers, garden vegetables or crops, has not been met by a typical mist or spray applicator. This is because modern-day herbicides are highly toxic and the fine herbicide spray or mist drift and are carried by air even on relatively calm days and sometimes over great distances to damage other vegetation. The rate of application of these herbicides is of paramount importance as the amount of herbicide applied is closely regulated by state and federal laws. The order of application of highly toxic herbicides should be in parts per million or even parts per billion. If too much of such herbicides is applied to a given area, the soil itself becomes toxic. This may result in toxic carry over from one season to the next season. Too frequent treatments may cause a build-up of a toxic soil condition unless the herbicide application rate is closely controlled. On the other hand, an insufficient application of herbicide will result in relatively poor kill. Because weed vegetation grows so quickly, it is usually desirable to have relatively frequent herbicidal treatments to kill any new growth, yet one wants to avoid the build-up of a toxic soil condition.

The prior art has suggested various devices for applying a herbicide to vegetation by wiping or direct contact, but these devices have suffered a serious deficiency in that they have employed a continuous gravity of herbicide, usually through a pre-set valve, irrespective of the speed of travel or the amount of vegetation being covered. Usually, the liquid flows, in these prior art devices, at a continuous rate by gravity down along the outside of the applicator. If the applicator was stopped in its forward motion, or when the applicator was being turned around at the end of a pass, large amounts of herbicide may be deposited on a relatively small area causing a localized, toxic soil condition. Such applicators are unsuited for operation by home owners who may stop or vary their speed of walking considerably between different areas. Of course, many home owners will walk at different speeds and, if the flow rate of herbicide is constant, either too little or too much herbicide will be applied depending on his travel speed. Typically, the home owner will stop or slow down at the edges of the lawn, hence, deposition of unusually large amounts of herbicide may be expected at these edge areas with the prior art devices.

In accordance with the present invention, the amount of herbicide applied more closely approximates a uniform application of the desired amount of herbicide even though the travel speed of the applicator is varied considerably in use. Thus, a home owner may move across the lawn and apply the proper amount of herbicide even though he varies his walking speed. Also, in its preferred form, the apparatus substantially stops feeding liquid to the lawn when the home owner stops his travel movement.

Also, in accordance with the present invention, the herbicide is applied at a rate related to the square footage of vegetation rather than, as in the prior art, to the total square footage covered by the applicator. Thus, for fields which have relatively little vegetation, less herbicide is applied than for fields with large amounts of vegetation.

The earth contains numerous bumps or depressions in which weeds may be present, and it is preferable to apply a herbicide to weeds if they are in a depression or on a bump. Also, weeds grow to various and differing heights which makes it more difficult to effectively apply a herbicide to both tall and short weeds. Additionally, many plants have a waxy film, hairs, thorns or other defense mechanisms which retard the application of sufficient herbicides to their top leaf surfaces. The present invention is particularly adapted to overcome these problems by turning over tall weeds and applying the herbicide to the underside of the plant tissue without damage to the plant tissue. It is important not to damage the plant tissue of the weeds as this will seriously interfere with the translocation of the herbicide into the plant system which is necessary for the herbicide to become effective.

Accordingly, an object of the invention is an applicator for applying herbicides capable of overcoming the foregoing problems.

A more specific object of the invention is an inexpensive rolling applicator for applying a herbicide to weeds in a lawn.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a front elevational view of the liquid apparatus according to the preferred embodiment of the invention;

FIG. 2 is a side view of the liquid-applying apparatus with a portion of one wheel broken away to show the application in its effective position;

FIG. 3 is an enlarged sectional view taken along the lines 3—3 of FIG. 1 in the direction of the arrows showing the manner of attachment of the liquid applicator to the hollow tubular reservoir;

FIG. 4 is a front elevational view of another embodiment of a liquid-applying apparatus;

FIG. 5 is a vertical view taken along the lines 5—5 of FIG. 4 in the direction of the arrows showing the manner of attachment of a handle;

FIG. 6 is a sectional view taken along the line 6—6 in FIG. 4 showing a valve arrangement and an applicator element;

FIG. 7 is an elevational view of a further embodiment of a liquid-applying apparatus;

FIG. 8 is a sectional view taken along the lines 8—8 of FIG. 7 showing the hollow interior of the tubular reservoir;

FIG. 9 is an enlarged sectional view showing the manner of attachment of a wheel to the hollow reservoir of the liquid-applying apparatus; and FIG. 10 is a sectional view taken along the lines 10—10 in FIG. 7 and showing the hollow tubular handle attached to the hollow reservoir of the liquid-applying apparatus.

As shown in the drawings for purposes of illustration, the invention is embodied in a liquid-applying apparatus which applys a liquid, usually a herbicide or an insecticide, to vegetation in a controlled manner by direct contact with the vegetation. The rate of liquid application is carefully regulated and related to the amount of vegetation encountered as contrasted with prior art devices in which a constant amount of liquid is applied irrespective of the speed of travel or the kind and amount of vegetation. More specifically, known prior art devices supply the liquid to an applicator at a relatively constantly rate, usually through an orifice or valve, and the amount of liquid applied per square foot of travel will vary appreciably with the speed of travel of the applicator device. Thus, when used by homeowners who may walk at various speeds across a lawn, or even stop their travel, the rate of herbicide application varied considerably. With these prior art devices, the rate of flow is almost entirely controlled by gravity and the liquid flows down and along the outside of the applicator. If the applicators were made of absorbent or porous materials, they became saturated and the flow of liquid continued to be a free flow down along the outer surfaces of the saturated applicators.

As will be explained in greater detail, the flow of liquid and rate of application is, in the present invention, more closely approximate to the amount and type of vegetation. For example, it has been found that a person using the illustrated apparatus may walk across his lawn at varying rates of speed from a very slow to a quite fast walk and still apply about the same amount of liquid to his lawn. As will be explained, an important factor in the control of flow of liquid from the applicator of this invention is a squeezing pressure by the vegetation on a compressible, porous applicator, which releases the liquid ot the vegetation squeezing it, but does not release liquid where there is no vegetation engaging the applicator. Thus, liquid is applied only at those areas which are engaging vegetation. Also, in the preferred embodiment of the invention a partial vacuum is built up and regulated to prevent a free flow of liquid by gravity.

Referring now to the drawings, and more particularly to FIGS. 1 and 2, there is shown a first embodiment of the liquid-applying apparatus, which includes a handle 15 extending upwardly from the body in the form of a horizontal tubular reservoir member 16 on which are journalled a pair of opposed wheels 17 and 18. As better seen in FIG. 2, the handle 15 is adapted to be grasped and held in a position shown in FIG. 2 and the wheels rotated across a weeded and grassy area whereby a dependent liquid applicator means 20 having a plurality of finger-like applicator elements 21 is dragged and rubbed across the grass and any weeds in the area W.

Other embodiments of the invention are illustrated in FIGS. 4 and 7 in which the liquid applicator means is in the form of a solid sheet or block of compressible, porous material such as open-pore polyurethane, natural or synthetic sponge materials. The applicators will become saturated with liquid and convey the same downwardly by wicking. It is preferred that the applicator be non-shrinking and relatively soft when dry. As the applicator is subjected to rubbing and abrasion, a reinforcing strip of textile material 35 is usually secured to the porous, compressible wicking material. One suitable wicking applicator material for the applicator 30 is a sheet of open cell (multicellular) sheet of polyvinyl chloride foam sold under the trademark ER12 by Mono-Sol Division, Baldwin-Montrose Chemical Co., Inc., Gary, Indiana.

In accordance with an important aspect of the invention, the flexible applicators 20 or 30 are backed by a stiffener or pressure means 25 disposed rearwardly, that is, behind, the applicator in the direction of travel so that vegetation extending upwardly and engaging the flexible element presses the applicator against the pressure means whereupon the applicator releases the fluid at the pressed area. As the vegetation passes under the pressure plate, the compressed area expands and thereby wicks liquid from the surrounding areas which are less or uncompressed. As weeds often grow higher than the turf, they are selectively given an application of liquid greater than the turf for they compress more of the applicator. Where the weeds are substantially dense, liquid is applied at a greater rate than it applied where the weeds are sparse. If an area between the wheels is barren of vegetation, the applicator 30 (FIG. 4) passing over the barren area will apply no liquid to it, and an applicator 21 (FIGS. 1 and 2) will apply only a minimal amount of liquid from a wiping of the outer surface of the applicator because of the lacking of any appreciable squeezing pressure on the applicator. The preferred pressure plate 25 is formed of a flexible sheet of polyethylene or other inexpensive material and is substantially co-extensive in length with the applicator but extends downwardly for a lesser distance than either the applicator 20 or 30. The pressure plate may be mounted for adjustment in the vertical direction depending upon the height of the turf. It is preferred that the lower end of the pressure plate be disposed at about the upper edge of the turf. The plate is sufficiently flexible to bend the plants without bruising or injuring their tissue, as such injury prevents transmigration of the herbicide through the circulatory system of the plant. The pressure plate 25 used in the embodiment of FIG. 4 is a solid, uncut sheet of rectangular shape. However, when employing the limp, finger-like elements 21 as the liquid-applying elements, a stiffening comb 34, FIG. 1 may be provided on the lower tendency of the stiffening plate 25. The comb resists the tendency of the finger-like elements 21 to trail behind the reservoir 16, and only have their end portions lightly engaging the weeded area W. The stiffening comb forces the finger-like elements 21 to engage and rub across the weeds for the purpose of assuring that the weeds are wetted and receive a substantial amount of the weed-killing solution in the manner above described. The stiffening comb 34 is formed from a plastic sheet of material with a plurality of spaced slots 33 therein to form a comb-like structure that is relatively stiff but still flexible.

For the purpose of providing a continuous supply of liquid to the applicator 20 or 30, there is provided means which define a liquid receiving chamber or reservoir into which a quantity of liquid is introduced for carrying across the lawn. In the FIG. 1 embodiment, the weed-killing liquid is carried within the hollow tubular handle 15, FIG. 10, which has a lower portion 38 telescoped over a smaller diameter portion 39 of a central T-shaped tube 40. The construction of the handle 15 and tubular reservoir 16 are of the same type of construction of the embodiments of FIGS. 1 and 7. Hence, common elements are designated by the same numerals and a description of these elements is made only in relation to the embodiment of FIG. 7.

As best seen in FIGS. 7 and 8, the hollow handle 15 is a straight piece of tubular pipe having a circular aperture 42 formed in its upper portion and adapted to be covered by a sliding end cap 43 positioned over the upper end of the handle 15. When the aperture 42 is uncovered, the aperture 42 permits ambient air to enter into the reservoir and thereby at least partially relieve the vacuum being created within the handle 15 as the liquid solution is being dispensed. That is, the liquid leaving the reservoir creates an increasing space for the air to expand within the reservoir. Since the reservoir is substantially air tight, the pressure of the air reduces below atmospheric pressure and retards the flow of liquid to the applicator.

The end cap 43 also can be removed from the end of the hollow handle 15, leaving the hollow interior of the handle exposed for the purpose of filling with a liquid solution. However, in actual practice, it has been found preferable to fill the hollow handle 15 and the tubular reservoir 16 through an aperture normally closed by a plug 45 in the T-shaped tubular member 40. As best seen in FIG. 10, the plug 45 is a small, tapered plug adapted to be wedged within an aperture 46 formed in the T-shaped tubular member 40. It is found in practice to be more desirable to fill the reservoir through the aperture 46 than through the end of the handle 15, since the liquid tends to flow out of the reservoir 16 and through the applicator elements 20 or 30 while filling through the end of the handle, whereas with the end cap 43 covering the valve or bleeding aperture 42 in the handle 15 and with the liquid being applied through the aperture 46, no loss of liquid is encountered.

As best seen in FIG. 7, the hollow tubular reservoir number 16 is comprised of a pair of opposed tubular pipe portions 50 and 51 telescoped and fitted over horizontally extending tubular portions 52 and 53 of the T-shaped tubular member 40. The handle 15 and horizontal reservoir member 16 are in practice formed from a plurality of inexpensive and commercially available plastic tubular pipe elements, namely, straight, tubular pipes 50 and 51 and a tubular T-shaped joint 40.

For the purpose of securing the porous-type applicator 20 to the horizontal reservoir 16, the tubular reservoir 16 is provided with a plurality of spaced bolts 63 extending through aligned and diametrically opposed apertures 60 and 61 which are adapted to receive the shank 62 of a bolt 63. The bolts 63 have a head 64 pressing a felt washer 65 across the outer surface of the aperture 61 and an opposite end 66 threaded to receive a thumb screw 67 for securing a curved and longitudinally extending seal and valve member 70 to the tubular reservoir 16.

The sealing and valve member 70 functions as a seal for the upper portion 72 of the porous applicator 20 and prevents the liquid from flowing over the top of the horizontal reservoir 16. With the thumb screws 67 tightened, the upper end of the sealing and valve member 70 bears tightly against the neoprene gasket member 73 and forces it tightly against the upper portion 72 of the porous applicator member 20 to compress the applicator member 20 against the upper portion 74 of the stiffening comb 34. The porous member is so tightly compressed that no fluid flows therepast.

The thumb screws 67 are tightened to apply the desired amount of pressure on the valve and sealing member 70, which pressure valve and sealing member 70 applies against the neoprene gasket 73 at its lower portion to reduce the cross-sectional area and the permeability of the cross-sectional area of the applicator 20 in the bight between the member 70 and the opposed portion of the stiffener comb 34. This manner of securing the porous applicator 20 to the hollow reservoir 16 results in a nonleaking seal and support for the attachment of a porous-type applicator.

Also the manner of attaching the wheels to the horizontal reservoir member 16 provided additional leakage problems which are overcome by the novel construction to be described hereinafter.

As best seen in FIG. 9, the tubular pipe 50 of the horizontal reservoir 16 has its outermost end portion 75 inserted into an annular end cap 76 and the annular end cap is fixedly secured to the end portion 75 of the tubular member 50 by an epoxy adhesive 77.

In forming an assembly for supporting the wheel 18, an axle 80 has a narrowed end portion 81 thereof inserted within an opening therefor in the end wall 82 of the annular end cap 76 and a washer 84 is placed over the reduced portion 81 after which the reduced end portion is peened at its end 82 to secured the axle 80 to the washer 84 and end cap 76. After the assembly of the axle 80, washer 82 and end cap 76 are mechanically secured together by peening over the end 82, the interior of the annular end cap 76 is filled with a slight coating of epoxy which seals the opening between the washer 84 and the end portion 81 of the axle and seals between the washer 84 and end cap 76. With the epoxy in the end cap 76, the end cap 76 is then inserted over the end portion of the tubular recess 50 to secure the tubular member 50 and the end cap 76 together by the epoxy adhesive.

The wheel 18 rotates about the fixed axle 80 and is held against axial movement by a washer 88 secured by a threaded fastener 89 threaded in a tapped hole within the axle 80. While the end cap 76 and axle 80 are only shown in FIG. 9, which is a cross-sectional view of FIG. 7, it is to be understood, as heretofore explained, that the same type of construction is employed to secure the wheels of the embodiment shown in FIG. 1 to the horizontal reservoir 16 shown in FIG. 1.

In contrast to the foregoing, the wheels 92 and 93 of the embodiment shown in FIG. 4 are journalled on solid plastic bosses 94 formed on the outer ends of a generally tubular plastic reservoir 95. The reservoir 95 of the embodiment of FIG. 4 has a much greater capacity than the horizontal reservoir 16 and hence is not provided with an additional vertical handle reservoir for carrying additional liquid. A metal bar 96 is bent into a general U-shaped configuration and has its end portions formed with outwardly extending bosses 97 adapted to be snapped within recesses therefor (not shown) in upstanding brackets 98 integrally formed on the tubular reservoir 95.

As best shown in FIG. 5 and 6, the tubular reservoir 95 has a plurality of apertures 101 (only one of which is shown) by which fluid is conducted to the applicator 30 carried within a wooden block 102. The applicator 30 extends the length of the tubular reservoir 95. The wooden block 102 has an arcuate surface 105 adapted to be secured to the tubular member 95 by a gasket and sealing means 107.

As shown in FIG. 6, the wooden block 102 has an aperture 109 aligned with the aperture 101 of the hollow reservoir 95 which leads to the applicator 30. The wooden block 102 is also provided with a rectangular solt extending longitudinally of the wooden block in which is received a valve plate 110 having a plurality of apertures 111 therein spaced at distances equal to the spacing of the apertures 109 and 101 respectively in a longitudinal direction. The valve plate 111 is provided with a handle 112 that extends upwardly through a slot 113 in a wooden block 102 so that an operator can slide the valve plate 110 to move the apertures 111 into full, partial or non-alignment with the apertures 101 and 109.

In this manner, the operator is able to stop flow or release liquid for flow from the reservoir 101 to the applicator element 30.

It will be recalled that in the embodiment of FIG. 7 that the end cap 43 and bleeding aperture 42 act as a valving means and serve to regulate, at least partially, the flow of liquid through apertures 115 in the wall 50. A suitable valve 120 (FIG. 9) may be placed on the body 50 to allow air to enter through the valve to the interior of the chamber 50 when the pressure reached a predetermined value. Thus, air will flow through the valve and relieve the partial vacuum when it builds up beyond the desired value. As shown in FIG. 9, the apertures 115 lead to a porous member 116 which is in engagement with the end portions 117 of the bristle applicator 130 and by tightening the nut 118 of the bolt 119 the applicator 30 and the porous member 116 are brought into sealed, fluid-receiving engagement with the apertures 115.

For home lawn installations, with a commercially available herbicide such as Banvel D. sold by Velsicol Chemical Corporation, Chicago, Ill., it has been found that a good kill of weeds can be obtained with an application of about three quarts of liquid per 5,000 square feet of lawn. This feed rate may be varied for other types of herbicide, or when the vegetation being treated is already moist. Also, as stated, the density and height of turf and weed population may vary the square footage of lawn covered by a three quart quantity of liquid. Also, it is to be appreciated that extremely fast or extremely slow speeds of applicator travel may result in a variation of application rate, but with normal operation and usage, the apparatus operates most adequately and as described.

The present invention is not limited to the illustrated apparatus of the type having a handle for manual use by the homeowner, but includes large heavier apparatus without handles, such as could be pulled by a tractor or the like across golf courses, parks, fields, farms or other large areas where a manual application is not economically feasible.

From the foregoing it will be seen that the liquid is applied at a rate and in areas controlled at least in part, by the amount and type of vegetation. By wicking the liquid to the point of application and having the applicator sufficiently soft to be compressed between the vegetation and a pressure means or stiffener means, a controlled application of herbicide is obtained which was not possible with the prior art.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. An apparatus for applying herbicide, pesticide liquid or the like to vegetation by direct contact as it is moved in a predetermined direction of travel, comprising a body, means supported by said body and defining a chamber for receiving said liquid, means defining passageways for liquid to flow from said chamber, means supporting said body above the vegetation and for traveling movement across the vegetation, means including a porous applicator element of compressible and expandable material comprising an open cell, synthetic sponge material and being in fluid communication with said chamber and depending from said body for engaging said vegetation, means securing said porous applicator in direct contact with said passageway means from said chamber, pressure means disposed rearwardly of the applicator element and depending from said body and in engagement with said porous element to cause a squeezing pressure on said porous element as the vegetation presses the porous element against said pressure means, said porous applicator element being compressible by vegetation pressure to release liquid and expandable when released from said vegetation pressure, said porous applicator element releasing liquid at areas and at rates associated with said squeezing so that the amount of vegetation engaging said porous elements has a controlling effect on the rate of application of liquid to said vegetation.

2. The apparatus of claim 1 in which the said pressure means engaging the porous element includes a flexible pressure plate which yields rearwardly as vegetation passes therebeneath.

3. An apparatus in accordance with claim 1 in which said means supporting said body includes a pair of wheels disposed at opposite ends of said body for rolling across said terrain and a handle is connected to said body and extends from and normal thereto for manipulation by the operator to push said apparatus across the terrain.

References Cited

UNITED STATES PATENTS

| | | | |
|---|---|---|---|
| 850,814 | 4/1907 | Burdett | 15—532 |
| 1,496,386 | 6/1924 | Sligh | 43—133 |
| 2,696,696 | 12/1954 | Tigerman | 401—48 XR |
| 2,784,030 | 3/1957 | Dietzel | 239—287 |
| 3,021,642 | 2/1962 | Ewing | 47—1.5 |
| 3,077,701 | 2/1963 | Osmun | 47—1.5 |

FOREIGN PATENTS

| | | |
|---|---|---|
| 11,263 | 7/1893 | Great Britain. |

ROBERT E. BAGWILL, Primary Examiner

U.S. Cl. X.R.

401—48

UNITED STATES PATENT OFFICE
CERTIFICATE OF CORRECTION

Patent No. 3,535,822   Dated October 27, 1970

Inventor(s) Edwin W. Schmunk and Carl J. Mitchell

It is certified that error appears in the above-identified patent and that said Letters Patent are hereby corrected as shown below:

Column 2, line 67, change "vertical" to --sectional--;
Column 3, line 4, correct the spelling of "interior";
Column 3, line 23, change "constantly" to --constant--;
Column 3, line 46, correct the spelling of "to";
Column 4, line 19, before "applied" insert --is--;
Column 6, line 46, correct the spelling of "slot".

SIGNED AND
SEALED

FEB 23 1971

(SEAL)
Attest:

Edward M. Fletcher, Jr.
Attesting Officer

WILLIAM E. SCHUYLER, JR.
Commissioner of Patents